April 8, 1969

J. C. COX ET AL 3,437,135

RETRIEVABLE FILTER APPARATUS

Filed Jan. 3, 1967

INVENTORS
J. C. COX
R. F. MELDAU

BY *Young & Quigg*

ATTORNEYS

United States Patent Office 3,437,135
Patented Apr. 8, 1969

3,437,135
RETRIEVABLE FILTER APPARATUS
Jack C. Cox and Robert F. Meldau, Bartlesville, Okla., assignors to Phillips Petroleum Company, a corporation of Delaware
Filed Jan. 3, 1967, Ser. No. 606,746
Int. Cl. E21b 43/10
U.S. Cl. 166—115          2 Claims

ABSTRACT OF THE DISCLOSURE

A filter for fluids injected into underground formations has means to seal the annular space between the filter body and the surrounding pipe, means to limit downward movement of the body, and pulling and running means.

This invention relates to the filtration of fluids injected through a borehole into a subsurface stratum. In another aspect this invention relates to preventing plugging of a formation into which a fluid is being injected. In another aspect this invention relates to a retrievable downhole filter.

In many well stimulation methods and secondary recovery programs, a fluid is injected through a well bore into a subsurface formation to displace oil or otherwise increase production. Often the injected fluid will corrode the tubing through which the fluid is injected. These corrosion products are carried down and against the face of the stratum into which the fluids are being injected, thus reducing formation porosity or completely plugging the formation. For example, injection of air containing water vapor at a higher temperature than the well bore results in water condensation and corrosion. Surface treatment to dry air or chemical treatment to control corrosion are expensive methods of preventing formation plugging.

Accordingly, it is an object of this invention to prevent formation plugging.

Another object of this invention is to filter fluids being injected through a borehole into a subsurface stratum.

Another object of this invention is to provide a simple and inexpensive filter apparatus for injection fluids.

These and other objects will be apparent to one skilled in the art upon consideration of the following disclosure, claims, and drawings.

According to the invention, there is provided an apparatus for filtering fluids injected into a subsurface stratum through a borehole penetrating the stratum comprising a filter body having inlet and outlet means, the inlet and outlet means being in fluid communication, a filter element for filtering the injection fluid, means to prevent fluids from bypassing the filter element and to limit downward movement of the filter body in the borehole and means attached to the filter body adapted to cooperate with running and pulling tools.

Further in accordance with the invention, the apparatus is adapted to fit inside a string of well tubing and sealing means are provided to seal the annular space between the filter body and the tubing between the inlet and outlet means; the downward motion of the filter body in the tubing being limited by a restriction or shoulder in the tubing cooperating with a supporting shoulder of the filter body. The supporting shoulder can bet formed by providing a collar about the filter body. Sealing means can be located above or below the collar. Sealing means can be provided below the supporting shoulder so that the supporting shoulder bears on the tubing shoulder through the sealing means. A sufficiently strong and resilient ring can be used to form a supporting shoulder which will also act as a seal.

The type of filter element used will depend upon the nature of the injection fluid and the corrosion products. Wire mesh covering the outlet means or other suitable permeable filter elements can be used. For example, the filter body can be packed with a glass wool or if desired the lower portion of the filter body can be fabricated from a permeable porous metal to provide filtration.

Figures 1, 2:
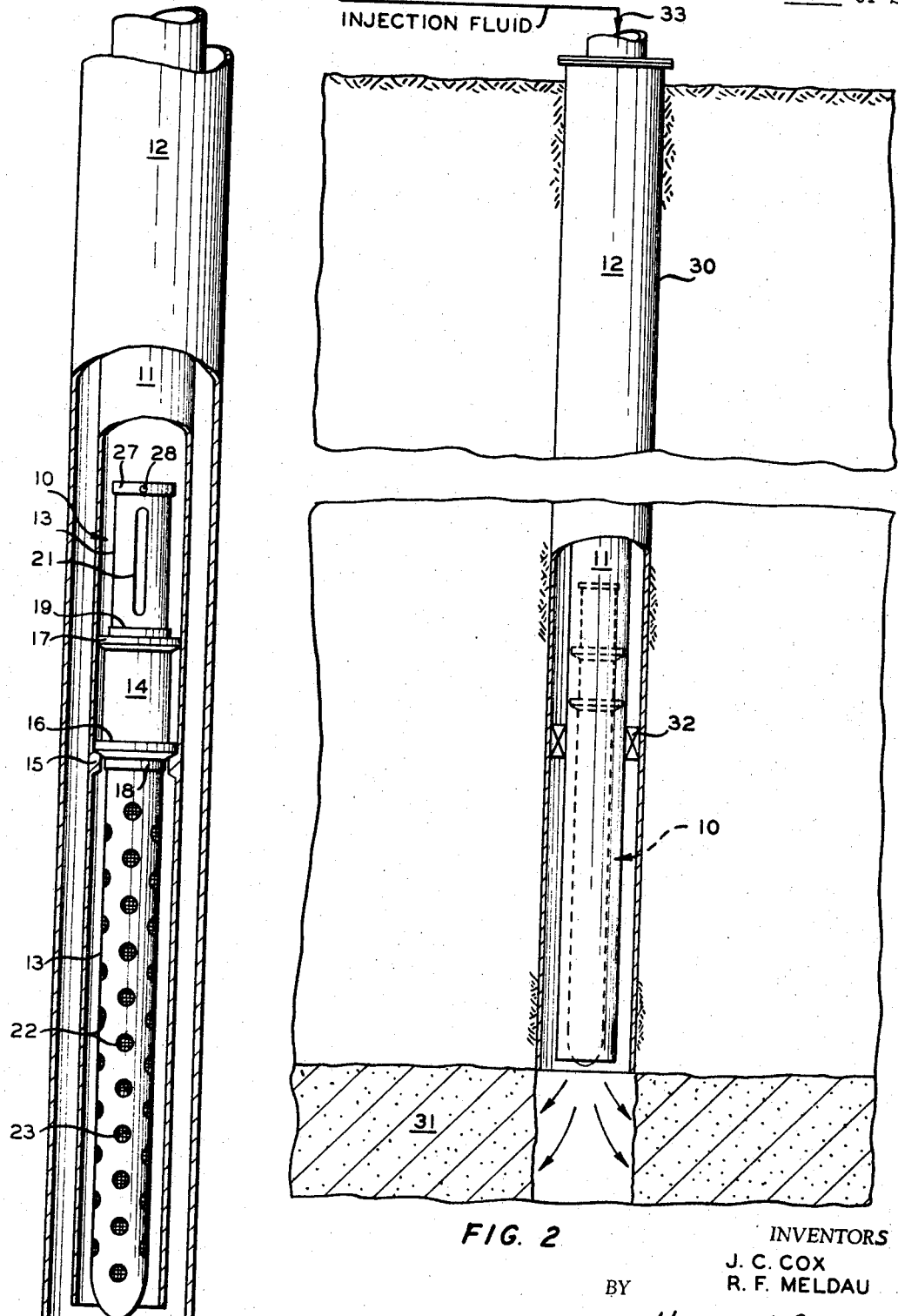
FIGURE 1 illustrates an apparatus of the invention in partial cross section.
FIGURE 2 is a partial cross section of an injection well embodying the apparatus of FIGURE 1.
Figure 3:
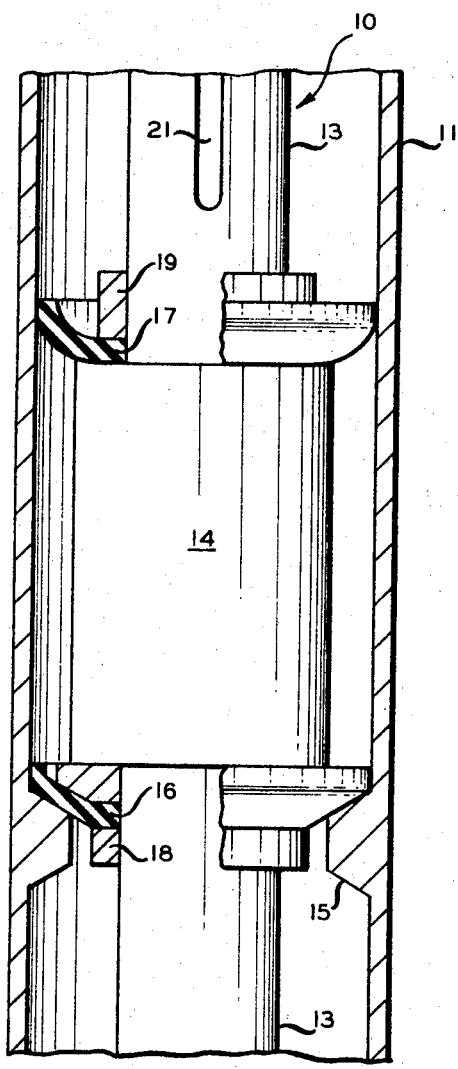
FIGURE 3 is an enlarged partial cross section of a portion of FIGURE 1.

Referring now to FIGURE 1, a retrievable downhole filter of the invention, denoted generally by numeral 10, is shown positioned in a tubing string 11 which is contained in a well bore casing 12. The filter 10 has a hollow cylindrical body 13, plugged at the lower end to prevent passage of unfiltered fluids, with a collar 14 around its outer diameter. Body 13 is of a suitable diameter to allow its passage through the tubing string 11 while collar 14 forms a support shoulder of a sufficient diameter to a tubing shoulder 15 to prevent the further downward travel of filter 10 in tubing 11. Collar 14 can be an enlarged part of body 13 or a separate piece suitably attached thereto. Shoulder 15 can be conveniently fabricated by welding a ring to the inner diameter of a piece of tubing. Thus, collar 14 and shoulder 15 cooperate to form a means of anchoring the filter in the tubing.

Seals 16 and 17 are provided around the outer diameter of body 13 to seal the annular space between body 13 and tubing 11 and prevent injected fluids from bypassing filter 10. As illustrated, seals 16 and 17 are upwardly facing rubber cups positioned at either end of collar 14, but any suitable sealing means can be used. As illustrated in the drawing, FIGURE 1, collar 14 forms a support shoulder adapted to cooperate with shoulder 15 to support body 13 and seal 16 is located below the support shoulder of collar 14 so that the support shoulder bears on shoulder 15 through seal 16. Retaining rings 18 and 19 prevent the cups from slipping up on the filter body during running or retrieving operations. Suitably rings 18 and 19 can be welded in place. The upwardly facing rubber cups 16 and 17 have the advantage of providing swabbing action when filter 10 is retrieved thus cleaning corrosion products from the walls of tubing string 11.

The upper portion of body 13 has a plurality of openings 21, depicted as slots, which act as the filter inlet. The portion of body 13 extending below collar 14 is provided with a plurality of openings 22 as filter outlets. The size and number of openings 22 and of openings 21 is determined by the rate at which it is desired to inject fluids. Body 13 provides fluid communication between inlets 21 and outlets 22. Filter elements 3 are placed between the inlet and outlet to provide filtration of the injection fluid.

The upwardly extending portion of filter body 13 above collar 14 has a flange 27 at the top and an opening extending through that portion to receive a shear pin 28. The flange 27 is sized to cooperate with conventional wire line fishing tools having an overshot with slips to engage the flange so that the filter can be retrieved to clean or replace the filter elements. The filter is returned to its position in the tubing by pinning to a conventional running tool having jars. The pin 28 can be of aluminum or brass so that it is easily sheared by releasing the jars once collar 14 is seated on shoulder 15.

FIGURE 2 illustrates the filter apparatus 10 positioned near the bottom of tubing string 11. Casing 12 lines a borehole 30 which penetrates a stratum 31 into which fluid is injected. A packer 32 seals the annular space between tubing 11 and casing 12 to prevent upward flow on the injection fluid. Injection fluid such as air, natural gas, steam, water, etc., is pumped through a conduit 33 from a source, not shown, into the tubing. As the fluid flows through the filter, tubing corrosion products and other solids carried in the fluid are removed. Thus, solids are prevented from being pressured into and against the face of formation 31.

The invention has been illustrated in FIGURE 2 as being positioned near the bottom of the hole. However, if borehole 30 penetrates stratum 31 packers may be installed below the formation and the casing perforated to allow injection of the fluids.

Reasonable variation and modification are within the scope of this invention which sets forth a novel retrievable downhole filter.

We claim:
1. Apparatus for filtering fluids injected into a subsurface stratum into a borehole penetrating said stratum in combination with a well tube extending into said borehole comprising:
 a filter body adapted to fit inside a well tubing, said body having inlet means, said inlet and outlet means being in fluid communication;
 a filter element carried by said body to filter fluids;
 means carried by said body to seal the annular space between said body and said tubing between said inlet and outlet means and to cooperate with means in said tubing to limit downward movement of said body in said tubing;
 means attached to said body adapted to cooperate with running and pulling tools;
 said body comprising a hollow cylinder having a collar on the exterior of said cylinder between said outlet and said inlet means;
 said means to seal said annular space comprising upwardly facing resilient cups at either end of said collar;
 said inlet means comprising a plurality of openings in said cylinder above said sealing means;
 said outlet means comprising a plurality of openings in said cylinder below said sealing means;
 said filter element comprising wire mesh covering said outlet openings;
 said means to limit the downward movement of said body comprising a tubing shoulder and a supporting shoulder formed by said collar; and
 said means adapted to cooperate with running and pulling tools comprising a flange at the top of said body and containing an opening having a shear pin for connecting said body to a running tool.

2. Apparatus for filtering fluids injected into a subsurface stratum through a borehole penetrating said stratum, comprising:
 a filter body adapted to fit inside a well tubing, said body having inlet means in the upper portion and outlet means spaced below said inlet means, said inlet and outlet means being in fluid communication;
 a filter element carried by said body to filter fluids;
 a collar between said inlet and outlet means;
 upwardly facing resilient cups on said collar to seal the annular space between said body and said well tubing between said inlet and outlet means;
 said inlet means comprising a plurality of openings in said body above said sealing means;
 said outlet means comprising a plurality of openings in said body below said sealing means;
 said filter element comprising filter covers for said outlet openings;
 means to limit the downward movement of said body comprising a supporting shoulder formed by said collar and adapted to be supported by a shoulder in the well tubing; and
 pulling and running means on said body and adapted to cooperate with running and pulling tools.

References Cited

UNITED STATES PATENTS

| | | | |
|---|---|---|---|
| Re. 5,507 | 7/1873 | Dickerson | 166—229 |
| Re. 14,756 | 11/1919 | Scott | 166—205 X |
| 87,775 | 3/1869 | Hines | 166—202 |
| 1,135,809 | 4/1915 | Jones | 166—195 |
| 1,356,187 | 10/1920 | Burgard | 166—228 |
| 2,248,834 | 7/1941 | Thomas | 166—115 |
| 2,725,107 | 11/1955 | Abendroth et al. | 166—205 X |
| 2,905,249 | 9/1959 | Ownbey | 166—157 X |
| 2,908,333 | 10/1959 | Schwab | 166—123 X |
| 3,314,481 | 4/1967 | Willman et al. | 166—205 |

JAMES A. LEPPINK, *Primary Examiner.*

I. A. CALVERT, *Assistant Examiner.*

U.S. Cl. X.R.

166—195, 202, 229